United States Patent
Charmat et al.

(10) Patent No.: US 6,609,594 B1
(45) Date of Patent: Aug. 26, 2003

(54) DISC BRAKE

(75) Inventors: Djamel Charmat, South Bend, IN (US); Brian Roach, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/975,176

(22) Filed: Oct. 11, 2001

(51) Int. Cl.⁷ .............................................. F16D 65/14
(52) U.S. Cl. ................................ 188/73.45; 188/73.37
(58) Field of Search ........................... 188/73.44, 73.45, 188/73.35, 73.36, 73.37

(56) References Cited

U.S. PATENT DOCUMENTS

| | | | | |
|---|---|---|---|---|
| 4,121,698 A | * | 10/1978 | Baum | 188/73.45 |
| 4,279,331 A | * | 7/1981 | Lupertz | 188/73.45 |
| 4,574,923 A | * | 3/1986 | Nakajima et al. | 188/73.45 |
| 4,865,163 A | * | 9/1989 | Kondo | 188/73.37 |
| 4,881,623 A | * | 11/1989 | Kondo | 188/73.38 |
| 5,111,914 A | * | 5/1992 | Thiel et al. | 188/73.34 |
| 5,439,084 A | * | 8/1995 | Vila Boluda | 188/73.44 |
| 5,467,848 A | * | 11/1995 | Knez | 188/73.45 |
| 5,593,006 A | * | 1/1997 | Le Deit et al. | 188/73.45 |
| 5,647,459 A | * | 7/1997 | Buckley et al. | 188/72.9 |
| 5,785,156 A | * | 7/1998 | Warwick et al. | 188/73.44 |
| 5,810,122 A | * | 9/1998 | Le Deit et al. | 188/73.45 |
| 6,135,245 A | * | 10/2000 | Kurasako et al. | 188/73.45 |
| 6,223,867 B1 | * | 5/2001 | Doi et al. | 188/73.45 |
| 6,293,373 B1 | * | 9/2001 | Weiler et al. | 188/73.38 |
| 6,454,056 B1 | * | 9/2002 | Iida | 188/73.45 |

* cited by examiner

Primary Examiner—Jack Lavinder
Assistant Examiner—Robert A. Siconolfi
(74) Attorney, Agent, or Firm—Leo H McCormick, Jr.; Warren Comstock

(57) ABSTRACT

Guide pins for retaining a caliper in an anchor of a disc brake assembly. The guide pins are characterized by a cylindrical body having a first end and a second end with a first diameter section that extends from the first end separated by a shoulder from a second diameter section that extends from the second end. The cylindrical body has a threaded axial bore that extends from a face on the second end toward the first end. A bolt has a shaft with threads thereon which mate with the threaded axial bore in the cylindrical body. A bushing is concentrically located on the shaft and in a corresponding axial opening in an ear that extends from the anchor. Torque applied to the bolt acts on and brings the bushing into engagement with the face on the second end of the cylindrical body however as the bushing has a greater length than the width of the axial opening of the ear, a desired gap is developed between a head on the bolt, the second end and the ear. Because of the gap, the bolt may freely rotated in the axial opening when the torque is terminated to realign the cylindrical body in a bore in the support member and as a result axial movement of the caliper is not substantially inhibited during a brake application.

11 Claims, 2 Drawing Sheets

DISC BRAKE

This invention relates to a disc brake and in particular guide pins for a disc brake that freely rotate in axial opening in ears on a caliper while sustaining a desired alignment between a caliper and a support member such that axial movement of the caliper is not impaired during a brake application and resistive torque developed during the brake application is essentially substantially transmitted into the support member through friction members rather than through the guide pins.

BACKGROUND OF THE INVENTION

Disc brakes having first and second guide pins correspondingly retained in first and second bores in a support member that is fixed to the frame of a vehicle are known in the prior art. In such disc brakes, the support member receives the spaced apart first and second guide pins to allow the caliper to axially slide and allow corresponding first and second friction members to engage with a rotor and effect a brake application. The following U.S. Pat. Nos. 4,448,287; 4,958,703; 4,976,339; 5,526,904; 5,749,445; 5,810,122; 5,810,112; 5,819,884 5,934,416 may be considered typical of such disc brakes. Basically during a brake application, the first and second guide pins slide in the first and second bores in response to a reaction force developed by pressurized fluid being presented to an actuation chamber that acts on an actuation piston to directly move the first friction member toward a rotor. The caliper itself reacts to the reaction force by moving a second friction member toward and into engagement with the rotor during the brake application. On termination the presentation of pressurized fluid to the actuation chamber, the first and second friction members move away from the rotor to establish a running clearance. If either the first or second friction members do not move away from the-rotor brake drag occurs which can cause undesirable wear of either and both the friction members and rotor. It is known to utilize the resiliency of a seal associated with the actuation piston to assist in the moving the first friction member away from the rotor. Unfortunately, the second friction member is not directly moved away from the rotor but must rely on knock back by the rotor to eliminate brake drag. Brake manufacturers have attempted to reduce brake drag by developing low slide force calipers however the components of current disc brakes require tight tolerance to maintain desired operational capabilities. Unfortunately, if such tolerances are not maintained, a perpendicular relationship between the guide pins and rotor is not achieved and caming may occur that causes the guide pins to bind and result in an increase in the force required to move or slide the caliper with respect to the support member. In a review of the procedures employed in the manufacture of a disc brake, it was discovered when two piece guide pins were used caming could be introduced into the system during the attachment of a fixing stud to the guide pins. This type caming may be introduced when torque is applied to the head of the stud and a flat on the guide pin engages a stop on the support member causes. When additional torque is applied to the head the stud shifts in the axial opening in the ear and as the torque tightens the stud in the guide the head is clamped onto the ear and as a result the guide pin is retained in this shifted position. Since this fixing or attachment procedure is repeated for each guide pin sufficient binding can result which can effect the force required to slide caliper slides with respect to the support member during a brake application.

SUMMARY OF THE INVENTION

A primary object of the present invention is to provide a disc brake having guide pins that have a gap between a head on a stud and/or shoulder on a shaft with respect to an ear on a caliper that permit each guide pin to rotate to a centered aligned position in an axial opening in the ear on a caliper to reduce the introduction of frictional resistance to sliding movement during a brake application.

In more particular detail, the disc brake of this invention has a support member secured to a vehicle with spaced apart first and second bores for receiving corresponding first and second guide pins to position a caliper over a rotor. The caliper has an actuation section located on a first side of the rotor and an arm located on a second side of the rotor. The actuation section has an actuation bore therein for retaining a piston to define an actuation chamber and a bridge connected to an arm. A first friction member is associated with the piston and a second friction member is connected to the arm such that the first and second friction members are positioned on opposite sides of the rotor. The support member has first and second slots for receiving first and second projection on the first and second friction member. The caliper has a first ear that extends from the actuation section for receiving a first head of on a stud of the first guide pin and a second ear that extends from the actuation section for receiving a second head on as stud of the second guide pin. A function of the first guide pin in the first bore and the second guide pin in the second bore is to position the caliper over the rotor such that a parallel alignment is created between the first and second friction members and the rotor. In response to a desired braking of a wheel of the vehicle, the actuation chamber is presented with pressurized fluid from a source. The pressurized fluid on being presented to the actuation chamber acts on the piston to develop an actuation force that acts on the piston to move the first friction member in the first and second slots toward and into engagement with the rotor while at the same time creating a reaction force which acts on the actuation section and causes the caliper to slide on the first and second guide pins and move the second friction member in the first and second slots toward and into engagement with the rotor to effect a brake application. The first and second guide pins are characterized by a shaft with a cylindrical body having a first end and a second end. The first end has a first diameter section separated by a first shoulder from a second diameter section on the second end. A threaded axial bore extends from a face on the second end toward the first end. A stud or bolt has a shaft that extends from a head. The stud has a third diameter section that is separated by a second shoulder from a fourth diameter section that has threads thereon. The third diameter section has a length greater than a length of the first and second axial openings in the first and second ears. A resilient bushing is concentrically located on the third diameter section of the stud or bolt and is located in the axial opening of a corresponding first or second ears. The threads on the fourth diameter section are mated with the threaded axial bore of the cylindrical member and a torque is applied to rotate the head of the stud and bring the second shoulder into engagement with the face on the second end of the cylindrical member to securely fix the bolt to the cylindrical body of the shaft. Because of the difference in the length of the third diameter section and the width of the ear when the stud is secured to the cylindrical body a gap is defined between the head of the stud and/or the face of the cylindrical body and the ear such that the stud may freely rotate in the axial opening of the ear to permit the cylindrical body to be aligned in the bore of the support member without creating frictional resistance to movement of the caliper during a brake application. In addition, a dimensional difference or manufacturing tolerance between the third diameter section of the stud and the axial opening in the corresponding ear is greater than a dimensional difference between the first projections on the first and second friction members and the first slot in the support member and the second projections on the first and second friction members and the second slots in the support member such that during a brake application, resistive forces are transmitted through the first and second friction members into the support member rather than through the first and second guide pins.

An advantage of this disc brake results in the ease in which the guide pins are aligned in corresponding first and second bores in a support member to maintain a caliper in a desired alignment with a rotor and thereby reduce the introduction of caming frictional forces during a brake application.

An object of this invention is to provide a disc brake assembly with guide pins which become self-aligning with bores in a support member during a brake application.

DETAILED DESCRIPTION

Figure 1:
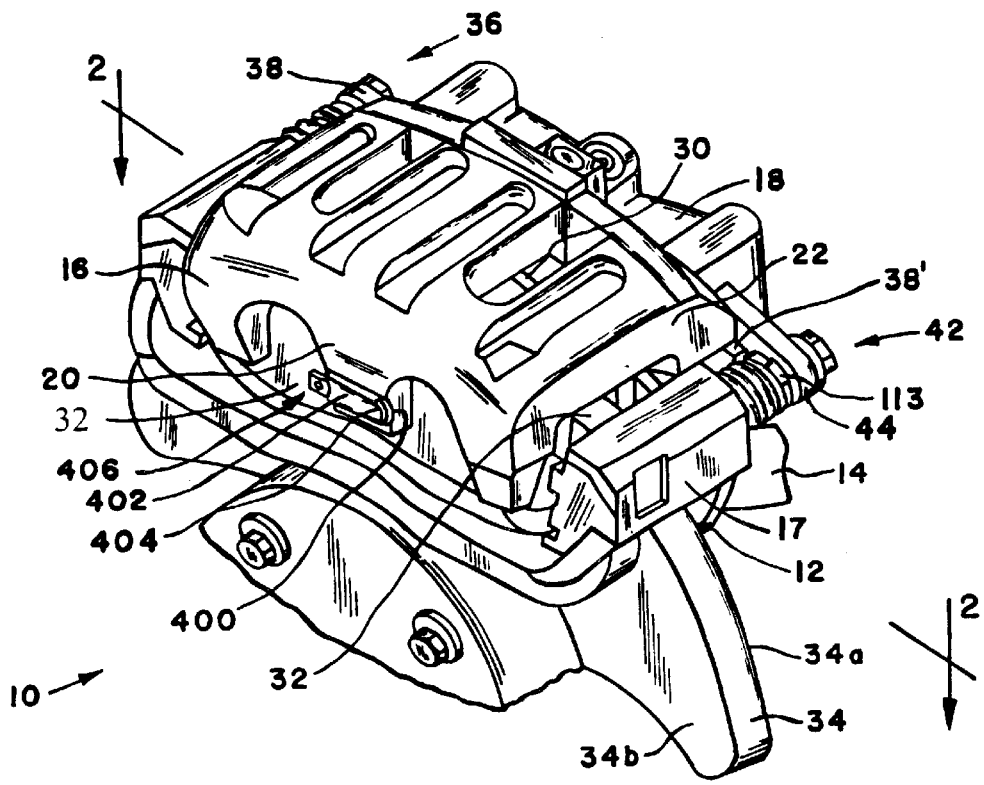
FIG. 1 is a perspective view of a disc brake made according to the principals of the present invention.

The disc brake 10 shown in FIG. 1 for use in a brake system of a vehicle is basically of a type known in the prior art as disclosed in U.S. Pat. No. 5,810,122.

The disc brake 10 includes an anchor or support member 12 that is fixed to a frame member 14 of a vehicle in a manner as disclosed in U.S. Pat. No. 5,988,761 and an integral caliper 16 which is connected to the support member 12 in a manner defined by guide pins 36 and 42 of the present invention.

Figure 2:
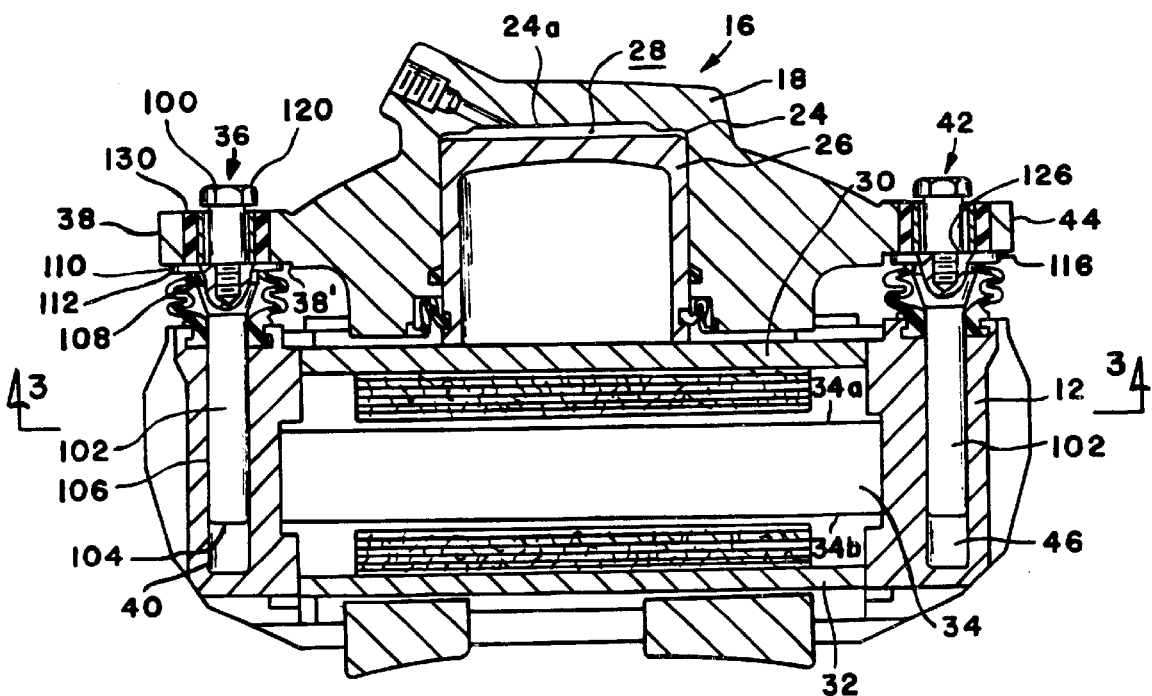
FIG. 2 is a sectional view taken along lines 2—2 of FIG. 1 showing the guide pins that extend through ears on the caliper and are located in the bores in the support member for the disc brake.
Figure 3:
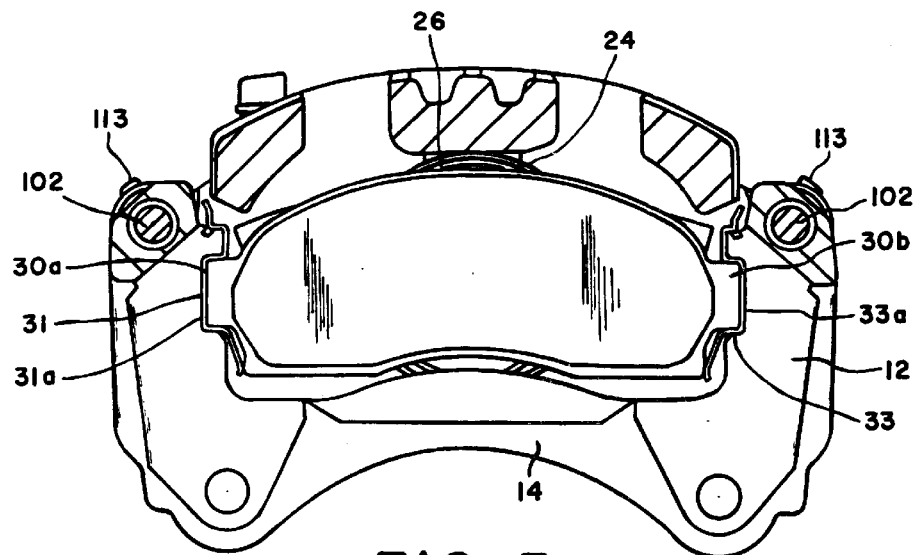
FIG. 3 is a sectional view taken along lines 3—3 of FIG. 2 showing first and second projections on a friction member that are correspondingly located in first and second slots in the support member.

In more detail as shown in FIGS. 1, 2 and 3, the integral caliper 16 of disc brake 10 includes an actuation section 18 that is connected by a bridge 22 to an arm 20. The actuation section 18 has a bore 24 therein for the retention of a piston 26 to define an actuation chamber 28. A first friction member 30 is connected to piston 26 while a second friction member 32 is connected to arm 20. The first friction member 30 has a first projection 30a that is located in a slot 31 and a second projection 30b located in slot 33 in the support member 12 while the second friction member 32 has a first projection 32a (not shown) located in slot 31 and a second projection 32b (not shown) in slot 33 in the support member 12. Slots 31 and 33 are parallel and with the support member 12 fixed to the vehicle to define a perpendicular relationship with rotor 34 such that the first 30 and second 32 friction members are respectively located adjacent a first face 34a and a second face 34b of a rotor 34 that rotates with an axle of the vehicle. The first guide pin 36 is connected to ear 38 that extends from the actuation section 18 and is mounted to slide in a first bore 40 in the support member 12. A second guide pin 42 is connected to ear 44 that extends from the actuation section 18 and is mounted to slide in a second bore 46 in the support member 12. The first 40 and second 46 bores are spaced apart, parallel, and designed to respectively hold the first guide pin 36 and the second guide pin 42 in a perpendicular relationship with respect to the rotor 34 such that the first friction member 30 and the second friction member 32 are held in corresponding planes respectively parallel with faces 34a and 34b on rotor 34. During a brake application, the caliper 16 slides with respect to the support member 12 without the introduction of caming as the guide pins 36 and 42 correspondingly move in bores 40 and 46.

In disc brake 10, during a brake application, a leading edge (projections 30a and 32a or 30b and 32b of the friction members 30 and 32 as defined by the rotation of rotor 34, engage the rotor 34 and as a result introduce a rotational moment or force into caliper 16 which is part of the torque forces experienced during a brake application. In the present invention, when projections 30a and 32a are the leading edge they engage the bottom 31a of slot 31 and when projections 30b and 32b are the leading edge they engage the bottom 33a of slot 33 whereby essentially all of the torque forces developed during a brake application are transmitted into the support member 12 without going through the guide pins 36 and 42. Thus, a function of the first guide pin 36 and second guide pin 42 is now essentially limited to maintaining the actuation force applied to the first 30 and second 32 friction members in an axial plane with the rotor 34 to reduce or attenuate un-even rotor wear between the leading and trailing edges.

Since the first guide pin 36 and the second guide pin 42 of this invention are identical and only the first guide pin 36 is hereinafter described in detail in conjunction with in FIG. 4 and 5 and a same number may be used for the second guide pin 42 to describe a structural feature or function.

Figure 4:
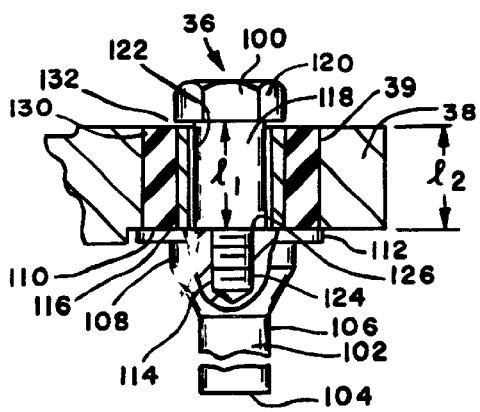
FIG. 4 is an enlarged view of an ear and guide pin of FIG. 2 showing a desired axial alignment to permit sliding between the caliper and support member without the introduction of undesirable frictional forces.
Figure 5:
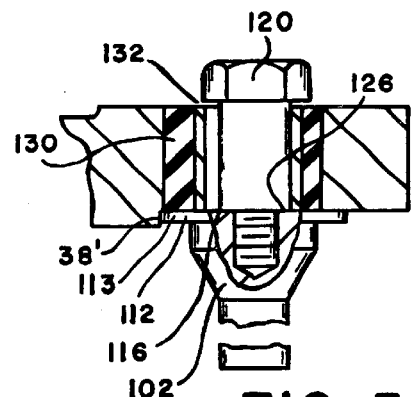
FIG. 5 is an enlarged view of an ear and guide pin of FIG. 2 showing the space relationship of the guide pin and the axial opening that can occur during assembly of a caliper on the support member.

Guide pin 36 as shown in FIGS. 2 and 4, is made up of a stud or bolt 100 and a shaft with a cylindrical body 102. The cylindrical member 102 is defined by a first end 104 with a first diameter section 106 separated by a first shoulder 108 from a second end 110 having a second diameter section 112. The cylindrical body 102 has a threaded axial bore 114 that extends from a face 116 on the second end 110 toward the first end 104. The bolt 100 is defined by a shaft 118 that extends from a head 120. The shaft 118 has a third diameter section 122 separated from a fourth diameter section 124 by a second shoulder 126. The fourth diameter section 124 has threads thereon while the third diameter section 122 is cylindrical and smooth and has a length $l_1$ which greater than a width $l_2$ of the axial opening 39 in the ear 38 in caliper 16. A resilient bushing 130 that is concentrically and loosely located on the third diameter section 122, engages axial opening 39. The threads on the fourth diameter section 124 are mated with the threaded axial bore 114 of the cylindrical body 102 to bring the second shoulder 126 into engagement with face 116 on the second end 110 of the cylindrical body 102 to secure bolt 100 to the cylindrical body 102. Since the length $l_1$ of the third diameter section 122 is greater than the width $l_2$ of axial opening 39 when shoulder 126 engages face 116, a gap 132 is defined between head 120 of bolt 100 and/or face 116 on cylindrical body 102 and ear 38 such that bolt 100 may rotate or move in axial opening 39 of ear 38 to align cylindrical body 102 in bore 40 of support member 12 without caming. In this situation, caming is defined as a mis-alignment between the guide pin 36 and bore 40 which would cause resistance to axial movement of cylindrical body 102 in bore 40.

Figure 6:
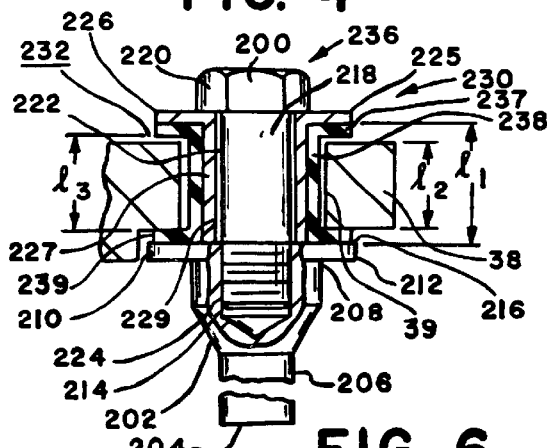
FIG. 6 is an alternate embodiment for a guide pin of this invention.

FIG. 6 illustrates an alternate embodiment of a guide pin 236 that includes a stud or bolt 200 and a shaft with a cylindrical body 202. The cylindrical member 202 is defined by a first end 204 with a first diameter section 206 separated by a first shoulder 208 from a second end 210 having a second diameter section 212. The cylindrical body 202 has a threaded axial bore 214 that extends from a face 216 on the second end 210 toward the first end 204. A shaft 218 that extends from a head 220 defines the bolt 200. The shaft 118 has a third diameter section 222 separated from a threaded fourth diameter section 224. A resilient bushing 230 includes a metal sleeve 226 and a cylindrical (rubber) member or grommet 238 that are concentrically located on the third diameter section 222 of bolt 200. Sleeve 226 has a flange 225 that extends from a cylindrical body 227, cylindrical body 227 has a length $l_1$ that is greater than a width $l_2$ of the axial opening 39 in the ear 38 in caliper 16 while grommet 238 has length $l_3$ between a first lip 237 and a second lip 239 that is greater that the width $l_2$ of ear 38. The threads on the fourth diameter section 224 are mated with the threaded axial bore 214 of the cylindrical member 202 to bring the end 229 on cylindrical body 227 of sleeve 226 into engagement with face 216 on the second end 210 of the cylindrical member 202 to secure bolt 200 to the cylindrical member 202. Since the length $l_1$ of the cylindrical body 227 of sleeve 226 is greater than the width $l_2$ of axial opening 39 when end 229 engages face 216, a gap 232 is defined between first lip 237 and second lip 239 on grommet 238 and ear 38 such that bolt 200 may freely rotate and radially move in axial opening 39 of ear 38 to align cylindrical member 202 in bore 40 of support member 12 without caming.

Figure 7:
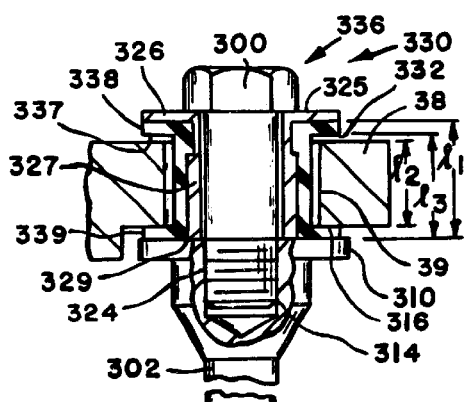
FIG. 7 is still a further embodiment for a guide pin of this invention.

FIG. 7 illustrates an other embodiment of a guide pin 336 which is similar to guide pin 236 with the exception of the resilient bushing 330 wherein grommet 338 is molded to a metal sleeve 326. Sleeve 326 has a flange 325 that extends from a cylindrical body 327 and cylindrical body 327 has a length $l_1$ that is greater than a width $l_2$ of the axial opening 39 in the ear 38 in caliper 16 while grommet 338 has length $l_3$ between a first lip 337 and a second lip 339 that is greater that the width $l_2$ of ear 38. Lip 337 has a radial diameter that is matched with flange 325 while lip 339 has a smaller diameter that is greater than the diameter of axial opening 39 and can be compressed when resilient bushing 326 is inserted into the axial opening 39 as illustrated in FIG. 7. As with guide pin 236, threads on the fourth diameter section 324 of guide pin 336 are mated with the threaded axial bore 314 of the cylindrical body 302 to bring the end 329 on cylindrical body 327 of sleeve 326 into engagement with face 316 on the second end 310 of the cylindrical body 302 to secure bolt 300 to the cylindrical body 302. Since the length $l_1$ of the cylindrical body 327 of sleeve 326 is greater than the width $l_2$ of axial opening 39 when end 329 engages face 316, a gap 332 is defined between the first lip 337 and second lip 339 on grommet 338 and ear 38 such that bolt 300 may rotate or move in axial opening 39 of ear 38 such that cylindrical body 302 is aligned in bore 40 of support member 12 without caming.

The caliper 16 for the disc brake 10 as best illustrated in FIG. 1 is further defined by a groove or indentation 400 which is centrally located on arm 20. A clip 406 having a resilient arm 402 is attached to the backing plate 33 of the second friction member 32 has a corresponding arcuate shape 404 which matches groove 400 and designed to assist in holding the second friction member 32 against arm 20 and perpendicular to grooves 31 and 33 in the support member 12.

Method of Assembly

The disc brake 10 is assembled to a vehicle through the following steps: Support member 12 is fixed to the frame 14. The first friction member 30 is positioned in support member 12 with the first projection 30a located in slot 31 and the second projection 30b located in slot 33 such the face is adjacent face 34a of rotor 34 and the second friction member 32 is positioned in support member 12 with the first projection 32a located in slot 31 and the second projection 32b located in slot 33 such the face is adjacent face 34b of rotor 34. The shaft or cylindrical body 102 of guide pin 36 is located in bore 40 and the cylindrical body 102 of guide pin 42 is located in bore 46. The caliper 16 with the piston 26 in a retracted state is positioned over the support member 12 and stud or bolt 100 with bushing member 130 located thereon is inserted into axial opening 39 of ear 38 such that the threaded fourth section 124 is mated with threads 114 in cylindrical body 102. A torque is applied to head 120 which rotates a flat 113 on the second diameter section 112 of the cylindrical body 102 into engagement with a stop 38' on caliper 16 to hold the cylindrical body 102 in a stationary position. Thereafter, further torque is applied to head 120 to bring shoulder 126 into engagement with face 116 on cylindrical body 102. This torque in fixing stud or bolt 100 to cylindrical body 102 can be sufficient to move and shift the third diameter 122 off center of the axial opening 39 in ear 38 by compressing the grommet 130 in a manner as illustrated in FIG. 5. However, on termination of the torque applied to head 120, bolt or stud 100 returns to a desired alignment since the length $l_1$ of the third diameter section 122 of bolt 100 is greater than the width $l_2$ of the ear 38 and a gap 132 is produced that allows for the caliper 12 to shift with respect to guide pin 36. Once guide pin 36 is secured in axial opening 39 of ear 38, end 17 of caliper 16 is rotated about guide pin 36 and ear 44 brought into alignment with cylindrical body 102 of guide pin 42 which is already located in bore 46. As the caliper 16 is brought into alignment, the arcuate shape 404 of resilient arm 402 of clip 406 is brought into engagement with groove 400 to connect friction member 32 with arm 20. Thereafter, stud or bolt 100 of guide pin 42 is attached to the cylindrical body 102 located in bore 46 and as before with respect to guide pin 36, torque is applied to head 120 and shoulder 126 brought into engagement with face 116 to fix stud or bolt 100 to the cylindrical body 102. Once a desired torque is applied to head 120 some shifting may occur that brings the third surface 122 off center of axial opening 39 in ear 44 in a manner as illustrated in FIG. 5, however as before, with a gap 132 created between the resilient bushing 130 and ear 44, the guide pin 42 is free to return to the alignment whereby cylindrical body 102 is aligned with in bore 46 to allow caliper 16 to move with respect to the support member 12 without binding or frictional resistance.

Mode of Operation

When an operator desires to effect a brake application, pressurized fluid is supplied to the actuation chamber 28 of bore 24. The pressurized fluid acts on piston 26 and actuation section 18 by way of the bottom 24a of bore 24, to develop an actuation force and a reaction force which moves the first friction member 30 into engagement with face 34a and the second friction member 32 into engagement with face 34b of rotor 34 to retard the rotation of rotor 34 and effect a brake application. During a brake application, the first projection 30a on the first friction member 30 and the first projection 32a on the second friction member 32 slide in slot 31 and the second projection 30b on the first friction member 30 and the second projection 32b on the second friction member 32 slide in slot 33 in the development of a resistive force created through the engagement of the first 30 and second 32 friction members with rotor 34. In this disc brake 10, a first dimensional difference between third diameter section 122 of bolt 100 and the axial openings 39,39' in ears 38 and 44 is greater than a second dimensional difference between the first projections 30a and 32a on the first 30 and second 32 friction members and the bottom surface 31a of first slot 31 in the support member 12 and the second projection 30b and 32b on the first 30 and second 32 friction members and the bottom surface 33a of second slot 33 in the support member 12. Thus, the resistive torque developed during a brake application is carried into the support member 12 through the first 30 and second 32 friction member rather than through the first 36 and second 42 guide pins as the first projections 30a and 32a on the first 30 and second 32 friction members engage the bottom surface 31a of the first slot 31 or the second projections 30b and 32b engage the bottom surface 33a of the second slot 33 before the third surface 122 on bolt 100 on the guide pins 36 and/or 42 engage axial opening 39. Thus, essentially all of the resistive torque is removed from the guide pins 36 and 42 and as a result the guide pins 36 and 42 during a brake application need only to function in maintaining the caliper 16 in alignment with the rotor 34.

We claim:

1. A disc brake assembly (10) having a support member (12) secured to a vehicle, a caliper (16) having an actuation section (18) connected by a bridge (22) to an arm (20), said actuation section (18) having a bore (24) therein for retaining a piston (26) to define an actuation chamber (28), a first friction member (30) connected to said piston (26) and a second friction member (32) connected to said arm (20), said caliper (16) having a first ear (38) and a second ear (44) extending from said actuation section (18), said first ear (38) having a first axial opening (39) for receiving a first guide pin (36) located in a first bore (40) in said support member (12) and said second ear (44) having a second axial opening (39') for receiving a second guide pin (42) located in a second bore (46) of said support member (12) to align said caliper (16) over a rotor (34) associated with a wheel of the vehicle, said actuation chamber (28) on being presented pressurized fluid from a source acting on said piston (26) to develop an actuation force to move said piston (26) and first friction member (30) toward said rotor (34) and acting on said actuation section (18) causing said caliper (16) to slide on said first (36) and second (44) guide pins and move said second friction member (32) toward said rotor (34) to effect a brake application, said first (36) and second (44) guide pins each being characterized by a cylindrical member (102) having a first end (104) with a first diameter section (106) separated by a first shoulder (108) from a second end (110) with a second diameter section (112), said cylindrical member (102) having a threaded axial bore (114) that extends from a face (116) on said second end (110) toward the first end (104), a bolt (100) having head (120) with a shaft (118), said shaft (118) having a third diameter section (122) separated from a fourth diameter section (124) by a second shoulder (126), said fourth diameter section (124) having threads thereon, said third diameter section (122) having a length (11) greater than a length (12) of said first (39) and second (39') axial openings in said first (38) and second (44) ears, and a resilient bushing (130) concentrically and loosely located on said third diameter section (122) while engaging one of said first (39) and second (39') axial openings of said first (38) and second (44) ears when the threads on said fourth diameter section (124) are mated with said threaded axial bore (114) of said cylindrical member (102) to bring said second shoulder (126) into engagement with said face (116) on said second end (110) of said cylindrical member (102) to secure said bolt (100) to said cylindrical member (102) while defining a gap (132) between said head (120) of said bolt (100) and said ear (38,44) and/or said face (116) and said ear (38,44) such that said bolt (100) may freely be rotated and moved within said axial opening (39,39') of said ear (38,44) to permit alignment of said cylindrical member (102) in said bore (40,46) of said support member (12) without caming on applying a torque force to said head (120) to attach said bolt (100) to said cylindrical member (102).

2. The disc brake (10) as recited in claim 1 wherein said support member (12) is characterized by a first slot (31) and a second slot (33), said first slot (31) receiving a first projection (30a) on said first (30) and second friction member (32) and said second slot (33) receiving a second projection (30b) of said first (30) and second (32) friction members, said first (30) and second (32) friction members sliding in said first (31) and second (33) slots during the development of a resistive force created through the engagement of said first (30) and second friction (32) members with said rotor (34) in a brake application, said resistive force is carried into said support member (12) through the engagement of said first projection (30a) on the first (30) and second (32) friction members with a bottom surface (31a) of said first slot (31) or through the engagement of said second projection (30b) with a bottom surface (33a) of said second slot (33).

3. The disc brake as recited in claim 2 further characterized by a first dimensional difference between said third diameter section (122) of said bolt (100) and said first axial opening (39) in said first ear (38) and said second axial opening (39') in said second ear (44) is greater than a second dimensional difference between said first projection (30a) on said first (30) and second (32) friction members said first slot (31) in said support member (12) and said second projection (30b) on said first (30) and second (32) friction members and said second slot (33) in said support member (12) such that resistive torque is essentially carried into the support member (12) through the first (30) and second (32) friction member rather than through the first (36) and second (44) guide pins.

4. The disc brake as recited in claim 3 wherein said arm (20) is characterized by an external surface having a centrally located indentation (400).

5. The disc brake as recited in claim 4 wherein said second friction member (32) is further characterized by a clip (406) having a resilient arm (402) with an arcuate surface (404) that is located in said indentation (400) on said arm (20) to retain said second friction member (32) in contact with said arm (20) and reduce the creation of noise caused by independent movement of said second friction member (32) due to movement of said vehicle on rough road surfaces.

6. The disc brake as recited in claim 5 wherein said resilient arm (402) is further characterized by assisting in maintaining said first (30a) and second (30b) projections on said second friction member (32) in a perpendicular relationship with said first (31) and second (33) slots in said support member (12).

7. A disc brake assembly having a support member secured to a vehicle, said support member having first and second slots for receiving first and second projections on corresponding first and second friction members to align the first friction member on a first side of a rotor and the second friction member on a second side of a rotor, caliper having an arm connected to said first friction member and an actuation section connected to said second friction member, said caliper having a first ear and a second ear that extend from said actuation section for respectively receiving a first guide pin located in a first bore of said support member and a second guide pin located in a second bore in said support member, said first and second guide pins aligning said caliper over said rotor, said actuation section on being presented pressurized fluid from a source having a piston that acts on and moves said first friction member toward said rotor and causing said caliper to slide on said first and second guide pins to move said second friction member toward said rotor to effect a brake application, said first and second guide pins each being characterized by a cylindrical body having a first end and a second end, said first end having a first diameter section separated from a second diameter section by a first shoulder, said cylindrical body having a threaded axial bore that extends from a face on said second end toward the first end, a bolt having a head with a shaft extending therefrom, said shaft having threads thereon that mate with said threaded axial bore, and bushing means concentric to said shaft and being located in a corresponding axial opening in one of said first and second ears, said bolt being fixed to said cylindrical body by applying a torque to said head until a desired gap is defined between said head and second end of said cylindrical body and said one ear such that said bolt may thereafter be freely rotated and moved within said axial opening of said ear to align and maintain alignment of said cylindrical member in a corresponding bore in said support member such that movement of said caliper during a brake application is not substantially inhibited.

8. The disc brake as recited in claim 7 wherein said shaft of bolt is further characterized by a third diameter section separated from a fourth diameter section by a second shoulder, said third diameter section having a length greater than a width of said first and second ears such that said second shoulder engages said face on said second end of said cylindrical member prior to said head engaging said first and second ears to establish said gap.

9. The disc brake as recited in claim 8 wherein said bushing means is characterized by a resilient grommet that loosely located on said third diameter to allow said shaft to be freely rotated within said opening in said ear while absorption for noise created during a brake application and providing for limited arcuate movement within said axial bore opening.

10. The disc brake as recited in claim 7 wherein said bushing means is characterized by a sleeve having a length greater than a thickness of said first and second ears on said caliper, said sleeve being concentrically located on said shaft, said sleeve having a first end with a flange thereon and a second end, and a resilient grommet concentrically located on said shaft and loosely located in said axial opening in said ear, said head on said bolt engaging said flange to bring said second end on said shaft into engagement with said second face prior to said resilient grommet engaging said first ear to establish said gap.

11. The disc brake as recited in claim 10 further characterized by a first dimensional difference between said shaft of said bolt and said axial openings in said first and said second ears is greater than a second dimensional difference between said first projection on said first and second friction members and said first slot in said support member and said second projection on said second friction members and said second slot in said support member such that resistive torque developed during a brake application is essentially carried into the support member through the first and second friction member rather than through the first and second guide pins.

* * * * *